US007927242B2

(12) United States Patent
Namie et al.

(10) Patent No.: US 7,927,242 B2
(45) Date of Patent: Apr. 19, 2011

(54) DOWNWARD ANGLE SETTABLE HYDRAULIC TENSIONER

(75) Inventors: Tsutomu Namie, Osaka (JP); Hiroshi Hashimoto, Osaka (JP); Hiroyuki Miyake, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 442 days.

(21) Appl. No.: 12/113,263

(22) Filed: May 1, 2008

(65) Prior Publication Data

US 2008/0318718 A1    Dec. 25, 2008

(30) Foreign Application Priority Data

Jun. 19, 2007   (JP) .................. 2007-161310

(51) Int. Cl.
    *F16H 7/08*   (2006.01)
(52) U.S. Cl. .................. 474/109; 474/101; 474/110
(58) Field of Classification Search .................. 474/110, 474/101, 109
    See application file for complete search history.

(56) References Cited

U.S. PATENT DOCUMENTS

| 4,874,352 | A | * | 10/1989 | Suzuki ................ 474/110 |
| 4,894,047 | A | * | 1/1990 | Breon et al. ............ 474/110 |
| 5,304,099 | A | * | 4/1994 | Deppe et al. ............ 474/110 |
| 5,720,684 | A | * | 2/1998 | Mott ................ 474/110 |
| 6,398,682 | B1 | * | 6/2002 | Suzuki et al. ............ 474/110 |
| 6,609,987 | B1 | * | 8/2003 | Beardmore ............ 474/111 |
| 2002/0142871 | A1 | | 10/2002 | Namie et al. |
| 2005/0014587 | A1 | * | 1/2005 | Konishi et al. ............ 474/110 |
| 2008/0220918 | A1 | * | 9/2008 | Namie et al. ............ 474/110 |
| 2008/0318717 | A1 | * | 12/2008 | Kurematsu ............ 474/110 |
| 2009/0209378 | A1 | * | 8/2009 | Kurematsu ............ 474/110 |

FOREIGN PATENT DOCUMENTS

| JP | 158545 | 11/1981 |
| JP | 6-65655 | 9/1994 |
| JP | 3712951 | 8/2005 |
| JP | 2009002373 A | * 1/2009 |
| JP | 2009192031 A | * 8/2009 |

* cited by examiner

*Primary Examiner* — Emmanuel M Marcelo
(74) *Attorney, Agent, or Firm* — Howson & Howson LLP

(57) ABSTRACT

In a hydraulic chain tensioner having a housing, a hollow plunger slidable in a plunger-accommodating hole in the housing, and a hollow sleeve extending into the plunger from a bottom of the plunger-accommodating hole, and a check valve mounted at the opposite end of the sleeve, a passage is provided on the outer surface of the sleeve to accelerate the balance of pressure between a first high pressure chamber between the check valve and the protruding end of the plunger and a second high pressure chamber between the inner end of the plunger and the bottom of the plunger-accommodating hole. In an alternative embodiment, balance is accelerated by communication between the second high pressure chamber and an oil reservoir inside the sleeve on the upstream side of the check valve.

1 Claim, 15 Drawing Sheets

DOWNWARD ANGLE SETTABLE HYDRAULIC TENSIONER

CROSS-REFERENCE TO RELATED APPLICATION

This application claims priority on the basis of Japanese patent application 2007-161310, filed Jun. 19, 2007. The disclosure of Japanese application 2007-161310 is hereby incorporated by reference.

FIELD OF THE INVENTION

The invention relates to hydraulic tensioners of the kind used for applying proper tension to a timing belt, a timing chain, or the like in a vehicle engine. The invention relates more specifically to a tensioner that can be set so that its plunger can protrude not only horizontally, but also at an oblique upward angle or at an oblique downward angle.

BACKGROUND OF THE INVENTION

Hydraulic tensioners have been widely used for suppressing vibration and maintaining proper tension in traveling transmission media such as engine timing chains which transmit power from a crankshaft to one or more valve-operating camshafts in an internal combustion engine.

A conventional hydraulic tensioner is described in United States Patent Application Publication 2002/0142871, published on Oct. 3, 2002. As shown in FIGS. 16 and 17, in the conventional hydraulic tensioner 500, a plunger 520 fits slidably in a plunger-accommodating hole 511 in a housing 510 and protrudes from the plunger-accommodating hole. A cylindrical hollow portion 521 is formed in the plunger, with one end open and facing toward a closed end of the plunger-accommodating hole. A plunger-biasing spring 550 extends from the closed end of the plunger-accommodating hole into the hollow portion 521 of the plunger 520, and presses against a closed end of the hollow portion adjacent the protruding end of the plunger, biasing the plunger in the protruding direction.

A high pressure chamber R is formed by the plunger accommodating hole 511 and the cylindrical hollow portion 521 of the plunger 520. A check valve unit 540 is provided within the high pressure chamber. As shown in FIG. 17, the check valve unit comprises a ball seat 541, a check ball 542 facing the ball seat 541, a ball-biasing spring 543, which presses the check ball 542 against the ball seat 541, and a retainer 544, which supports the ball-biasing spring 543.

When the conventional hydraulic tensioner 500 is mounted on an engine at a downward angle as shown in FIG. 16, that is, when it is mounted so that its plunger protrudes obliquely in a downward direction, the high pressure chamber R is filled with oil when the engine is operated, and the tensioner maintains proper control of chain tension. Damping of vibration is achieved by leakage of oil through a slight gap between the plunger-accommodating hole 511 of the housing 510 and the outer circumferential surface of the plunger 520.

Oil is replenished in the high pressure chamber R through the check valve unit 540. However, if the engine is not operated for an extended period of time, oil in the high pressure chamber R can leak downward by gravity through the gap between the plunger-accommodating hole and the plunger, as indicated in FIG. 17. Outside air A, at atmospheric pressure, is drawn into the high pressure chamber R through the above-mentioned gap, displacing the oil and permitting oil leakage to continue. The air A then mixes with the oil in the high pressure chamber, and accumulates at the upper part of the chamber as shown in FIG. 17. Because the accumulated air is compressible, the damping effect of the tensioner is impaired, backlash of the timing chain is not suppressed, and abnormal sounds are generated. Damage to the timing chain can result from excessive backlash. Additionally, oil consumption in the tensioner is increased, and the oil pump must supply an increased amount of oil to the tensioner.

In the manufacture of the conventional hydraulic tensioner 500, in order to effect proper damping while avoiding excessive oil leakage, it was important to establish a precise clearance between the plunger-accommodating hole of the housing and the outer circumferential surface of the plunger. Achieving the required precision required special measures to avoid size errors, special surface finishing, selection of suitable materials and measurement of oil leakage.

Accordingly, an object of the invention is to solve one or more of the above-mentioned problems. A general object of the invention is to provide a downward angle settable hydraulic tensioner in which the full hydraulic damping force is exhibited both at the time of engine start-up and during the subsequent operation of the engine, so that backlash of the timing chain and excessive changes in chain tension are suppressed, and generation of abnormal sounds is prevented.

SUMMARY OF THE INVENTION

The downward angle settable hydraulic tensioner according to the invention comprises a housing having a plunger-accommodating hole with a cylindrical inner wall and a bottom end. A plunger having a cylindrical outer surface is slidable in the plunger-accommodating hole and protrudes therefrom to apply tension to a traveling chain. The plunger has a hollow interior portion with a cylindrical inner wall and an opening facing toward the bottom end of the plunger-accommodating hole. The plunger also has an annular end portion surrounding its opening. A part of the plunger-accommodating hole forms a first high pressure oil chamber.

A plunger-biasing spring is disposed in the high pressure oil chamber and urges the plunger in a direction to protrude from the housing. An oil supply passage is provided in the housing for supplying oil to the high pressure oil chamber. A check valve unit is arranged to block flow of oil from the high pressure oil chamber through the oil supply passage. A hollow sleeve, having a first end fixed at the bottom end of the plunger-accommodating hole, communicates with the oil supply passage. The sleeve extends into the hollow interior portion of the plunger, the interior of the sleeve forms an oil reservoir, and the sleeve has a cylindrical outer circumferential surface in sliding contact with the cylindrical inner wall of the plunger. The check valve unit is fixed to the sleeve adjacent a second end of the sleeve opposite from its first end so that the check valve is located inside the hollow interior portion of the plunger. A second high pressure oil chamber is defined by a part of the inner wall of the plunger-accommodating hole, the bottom end of the plunger-accommodating hole, the annular end portion of the plunger, and a portion of the outer circumferential surface of the sleeve. Means are provided for accelerating the balance between oil pressure in the first high pressure chamber and oil pressure in the second high pressure chamber.

In one embodiment of the invention, the balance-accelerating means comprises a passage formed on the outer circumferential surface of the hollow sleeve, the passage providing oil communication between the first high pressure chamber and the second high pressure chamber.

In another embodiment, the means for accelerating comprises a passage formed in the sleeve adjacent its first end, the passage providing oil communication between the second high pressure chamber and the oil reservoir formed in the interior of the sleeve.

When an engine in which the tensioner is incorporated with its plunger protruding obliquely downward is inoperative for a long period of time, even if oil leaks by gravity from the second high pressure chamber surrounding the rear portion of the sleeve through the slight gap between the plunger-accommodating hole and the plunger, and outside air is drawn into the second high pressure chamber, the outside air does not enter the first high pressure chamber, which is positioned lower than the second high pressure chamber. The damping action resulting from leakage of oil though a gap between the sleeve and the inner wall of the plunger is unimpaired, and backlash of the timing chain upon starting of the engine and abnormal sounds are prevented.

Furthermore, since the plunger slides between the inner circumferential wall of the plunger-accommodating hole and the outer circumferential surface of the sleeve, a labyrinth is formed which is composed of a first gap between the outer circumferential surface of the sleeve and the cylindrical inner wall of the plunger, and a second gap between the outer circumferential surface of the plunger and the inner circumferential surface of the plunger-accommodating hole. Thus oil leakage from the inside of the tensioner is suppressed and oil can be retained the tensioner over a long period of time.

The changes in volumes of the first and second high pressure chambers differ as the plunger moves. Consequently, a difference can be generated between the pressures in the two chambers. Since oil pressure balance accelerating means are provided to balance the pressure between the first and second high pressure chambers, the oil pressure in the second high pressure chamber is rapidly harmonized with the oil pressure in the first high pressure chamber at the time of engine start-up, and maintained during subsequent engine operation. Thus, the ability of the plunger to prevent timing chain backlash on engine-startup, and to follow tension changes in the timing chain during subsequent engine and is remarkably improved.

Where the oil pressure balance accelerating means comprises a passage formed on the outer circumferential surface of the sleeve, providing oil communication between the first high pressure chamber and the second high pressure chamber, a difference in the oil pressures in the two chambers resulting from different volume changes that occur as the plunger moves, is rapidly balanced so that the tensioner's damping performance is maintained. Thus the tensioner maintains its ability to exert a damping effect on changes in chain tension, both at the time of engine start-up, and during subsequent engine operation.

When the means for accelerating comprises a passage formed in the hollow sleeve adjacent its first end, providing oil communication between the second high pressure chamber and the oil reservoir in the interior of the sleeve, balancing does not take place by direct communication between the first and second chambers. However, on retraction of the plunger, excessive pressure in the second chamber is prevented by flow of oil from the second chamber into the reservoir. Similarly, when the plunger moves in the protruding direction, an excessive drop in pressure within the second chamber is prevented by flow of oil from the reservoir into the second chamber. In this way, the pressure in the second chamber is kept more nearly equal to the pressure in the first chamber, and the maximum damping effect of the tensioner on a change in chain tension, at the time of engine start-up and during the subsequent engine operation, can be exhibited.

DETAILED DESCRIPTION OF THE PREFERRED EMBODIMENTS

Figure 1:
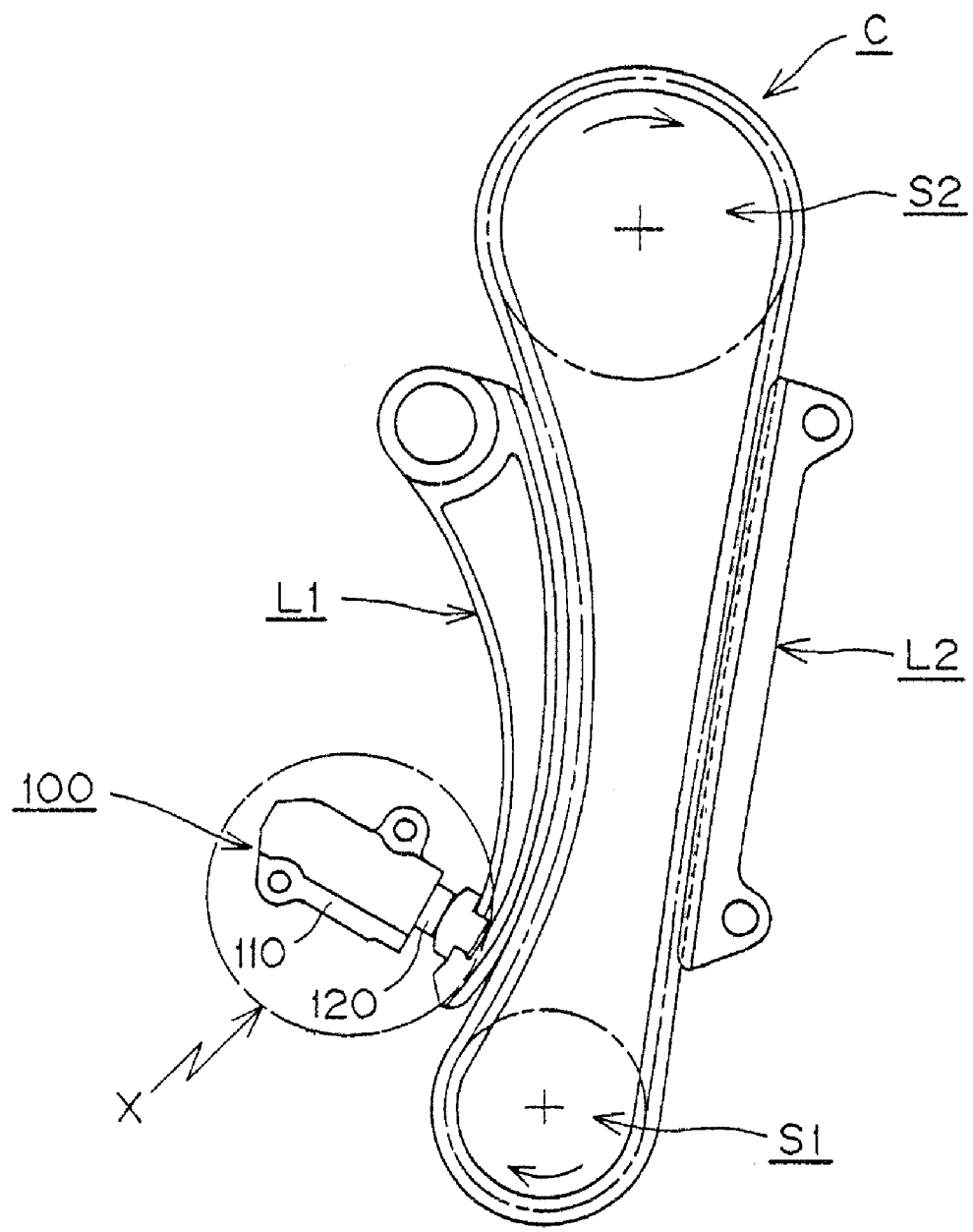
FIG. 1 is a schematic elevational view of an engine timing transmission incorporating a downward angle settable hydraulic tensioner according to the invention.
Figure 2:
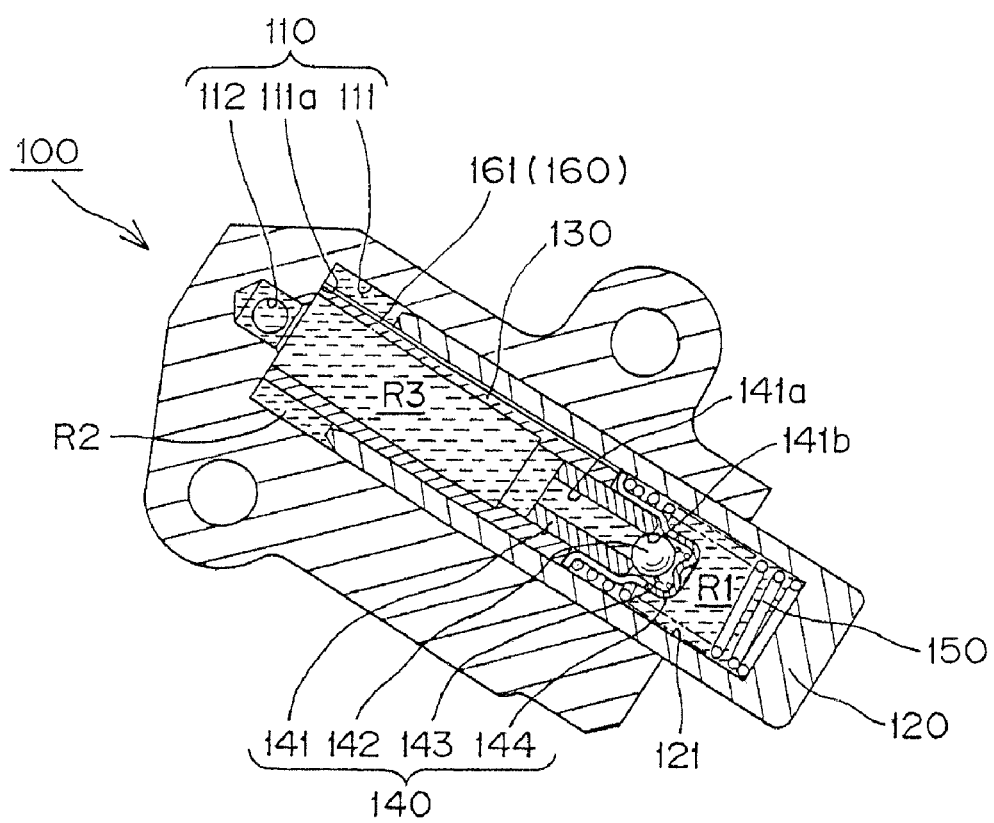
FIG. 2 is an enlarged sectional view of the hydraulic tensioner designated X in FIG. 1.

As shown in FIGS. 1 and 2, a downward angle settable hydraulic tensioner 100, according to a first embodiment of the invention, is mounted on an engine body on the slack side of a timing chain C engaged with a driving sprocket S1 rotated by a crankshaft, and a driven sprocket S2 fixed to a camshaft. The sprockets rotate in the direction indicated by the arrows in FIG. 1. The plunger 120 of the tensioner protrudes extendibly and retractably from the front of the housing 110. The plunger engages a pivoted lever L1, on which the slack slide of the chain slides, at a location spaced from the lever's pivot axis, thereby maintaining tension in the chain. A fixed guide L2 is in sliding engagement with the tension side of the chain.

As shown in FIG. 2, the plunger 120 is slidable in, and protrudes from, a plunger-accommodating hole 111 formed in a tensioner housing 110 and having a closed end. A cylindrical hollow portion 121 is formed inside the plunger, having an opening facing the closed end 111a of the plunger-accommodating hole.

A sleeve 130, is fixed to the closed end 111a of the plunger-accommodating hole 111, and communicates with an oil supply passage 112 formed at the closed end 111a. The sleeve 130 protrudes into the cylindrical hollow portion 121 of the plunger 120, and the cylindrical inner wall of the hollow portion of the plunger is in sliding contact with the outer wall of the sleeve.

A check valve unit 140 is fastened to the protruding end of the sleeve 130 and a first high pressure chamber R1 is formed in the cylindrical hollow portion 121 of the plunger between the check valve unit and the closed protruding end of the plunger. The check valve unit 140 comprises a ball seat 141 having an oil passage 141a. The ball seat is press-fit into the sleeve 130. A check ball 142 is located on the high pressure chamber side of the valve seat and engageable with a protruding end 141b of the valve seat. A ball-biasing spring 143 urges the check ball 142 against the end 141b of the seat 141, and a bell-shaped retainer 144 restricts the movement of the check ball 142.

As seen in FIG. 2, a second high pressure chamber R2 is surrounded by a portion of the cylindrical inner wall of the plunger-accommodating hole 111 in the housing 110, the bottom end of the plunger-accommodating hole surrounding the oil supply passage, the annular rear end portion of the plunger 120, and a portion of the outer circumferential surface of the sleeve 130. This second high pressure chamber serves the same function as the first high pressure chamber R1. That is, it contains oil that can leak slowly through a restricted passage, and thereby damp movement of the plunger. Further, an oil reservoir R3 communicating with oil supply passage 112 formed inside the sleeve 130.

A plunger biasing spring 150, accommodated in the first high pressure chamber R1, continuously urges the plunger 120 in the protruding direction, so that a front end of the plunger 120 can follow the movement of the tensioner lever L1 (FIG. 1).

Figure 3A:
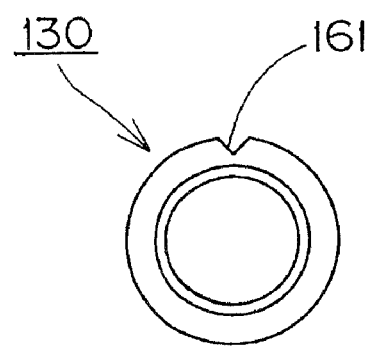
FIG. 3(a) is an enlarged end view of the inner sleeve in the tensioner of FIG. 2.
Figure 3B:
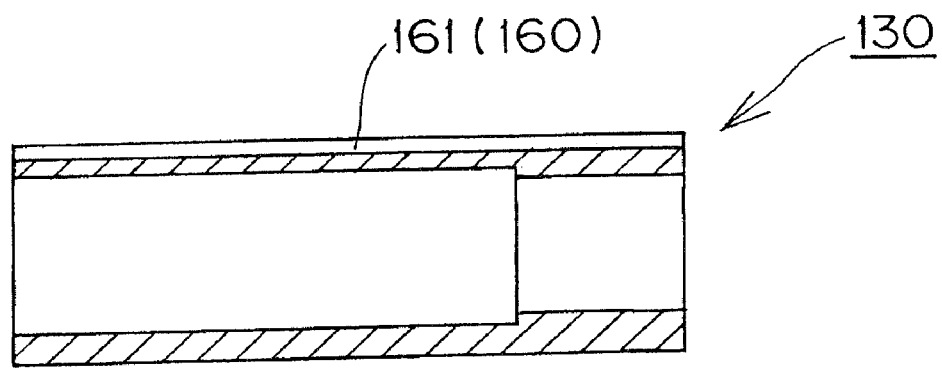
FIG. 3(b) is a axial cross sectional view of the inner sleeve in the tensioner of FIG. 2.

An oil pressure balance accelerating means 160 balances the oil pressure in the second high pressure chamber R2 with the oil pressure in the first high pressure chamber R1. In the embodiment illustrated in FIGS. 2-6, the oil pressure balance accelerating means 160 is in the form of a longitudinal groove 161 provided on the outer circumferential surface of the sleeve 130. This groove, best shown in FIGS. 3(a) and 3(b), provides fluid communication between the first high pressure chamber R1 and the second high pressure chamber R2.

When an impact force acts on the protruding front end of the plunger 120 as a result of a sudden increase in tension in the timing chain C, the plunger 120 is rapidly pushed in the retracting direction against the biasing force of spring 150, and the pressure of oil in the first high pressure chamber R1 is increased so that the check ball 142 of the check valve unit 140 is pushed against the ball seat 141, and reverse flow of oil from chamber R1 to the oil passage 141a in the ball seat 141 is blocked.

Figure 4:
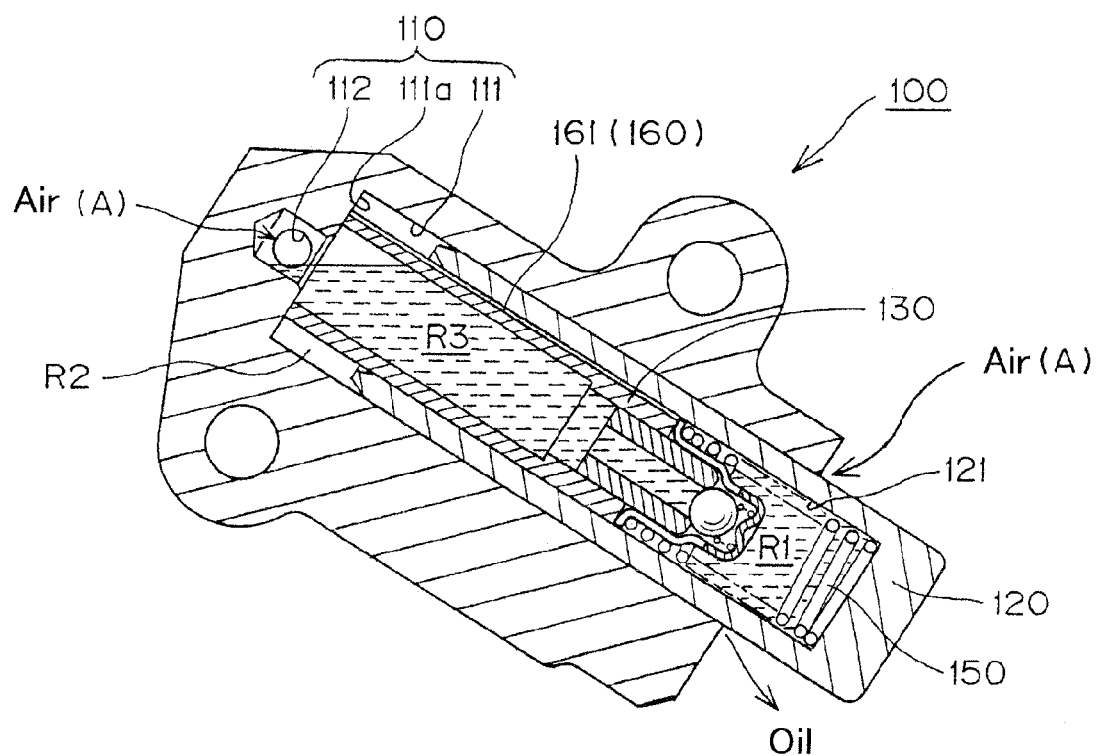
FIG. 4 is a sectional view showing the oil level in the tensioner of FIG. 2, when the engine has not been operated for a long period of time.

As shown in FIG. 4, when the engine stop is inoperative for a long period of time, even if oil in the second high pressure chamber R2 leaks downward by gravity through the slight gap between the plunger-accommodating hole 111 of the housing 110 and the outer circumferential surface of the plunger 120 and outside air A is drawn into the second high pressure chamber R2, the air does not flow into the first high pressure chamber R1, which is lower than the second high pressure chamber R2. Thus, the damping action of the oil in the first high pressure chamber R1 is unimpaired, and the backlash of the timing chain C, which is liable to occur upon starting of the engine, is prevented, and the generation of abnormal sounds is avoided.

Since the plunger 120 slides between the inner circumferential wall of the plunger-accommodating hole 111 and the outer circumferential surface of the sleeve 130, a labyrinth is formed, comprising a first gap between the outer circumferential surface of the sleeve 130 and the inner circumferential wall of the plunger, and a second gap between the outer circumferential surface of the plunger and the inner circumferential wall of the plunger-accommodating hole 111. The labyrinth significantly suppresses undesired leakage of oil from the tensioner without impairing leakage necessary to achieve the tensioner's damping effect.

Figure 5:
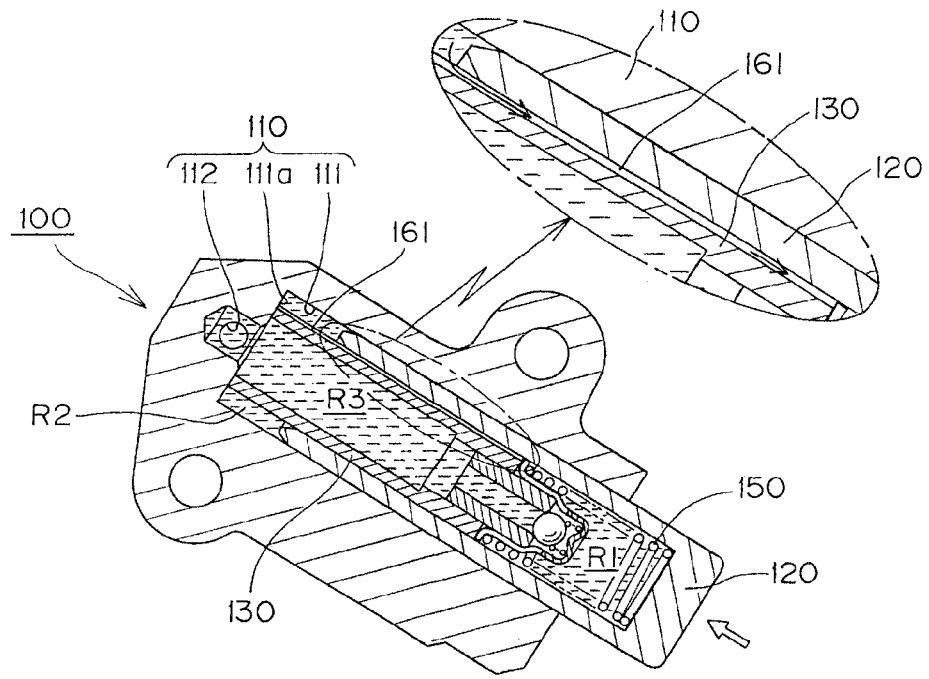
FIG. 5 is a schematic cross-sectional view of the tensioner of the invention, illustrating in an enlarged auxiliary view the direction of increase in oil pressure by oil communication through a groove on the inner sleeve when the plunger is pushed in the retracting direction.
Figure 6:
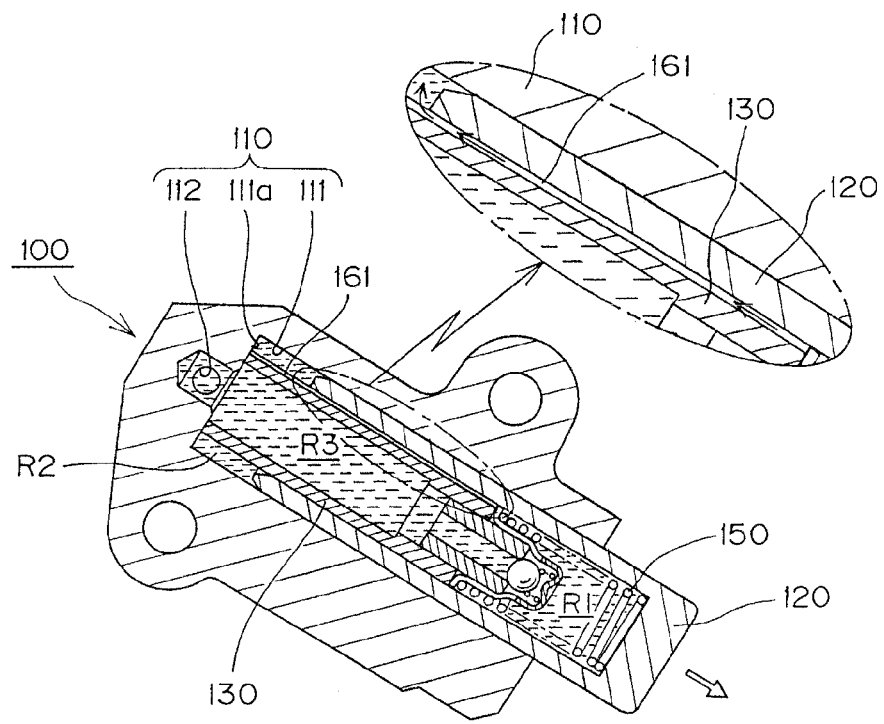
FIG. 6 is a similar schematic cross-sectional view of the tensioner, illustrating in an enlarged auxiliary view the direction of increase in oil pressure by oil communication through a groove on the inner sleeve when the plunger is moved in the protruding direction.

During engine operation, when the plunger 120 is pushed back into the housing 110, and when the plunger 120 moves in the protruding direction, as shown in FIGS. 5 and 6, oil pressure in the second high pressure chamber R2 is rapidly balanced with the oil pressure in the first high pressure chamber R1. Thus, the tensioner has the ability to follow large and rapid changes in chain tension during engine operation. Because the check valve unit extends into chamber R1, the volume of oil surrounding the check valve unit cannot be displaced by movement of the plunger. As a result, the percentage change in volume of chamber R2 is always greater than the change in volume of chamber R1 for a given amount of plunger movement. Thus, as shown by the arrows in the enlarged auxiliary view in FIG. 5, as the plunger is pushed inward, oil flows from chamber R2 to chamber R1. Similarly, as shown in FIG. 6, as the plunger moves in the protruding direction, oil flows in the opposite direction, from chamber R1 to chamber R2.

In summary, since different oil pressures generated in chambers R1 and R2 due to their different volumes are rapidly balanced, good damping performance can be obtained, and a rapid damping response to changes in chain tension, both at the time of engine start-up and during subsequent engine operation, is exhibited.

Even if a sudden force exerted by the timing chain C presses back on the plunger 120 on engine start-up under normal conditions of use, oil in the first high pressure chamber R1 leaks to the second high pressure chamber R2 through the oil communicating groove 161, and the sudden force can be absorbed.

Figure 7A:
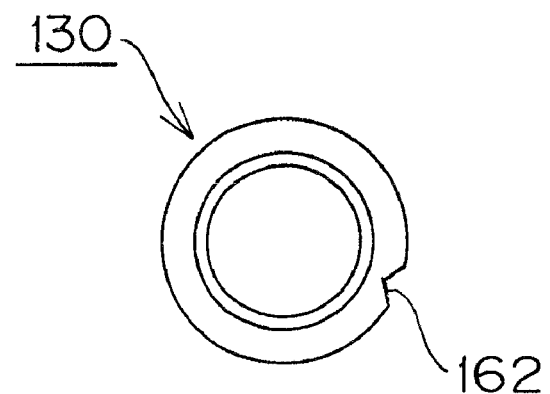
FIG. 7(a) is an end view of the inner sleeve of a modified version of the tensioner.
Figure 7B:
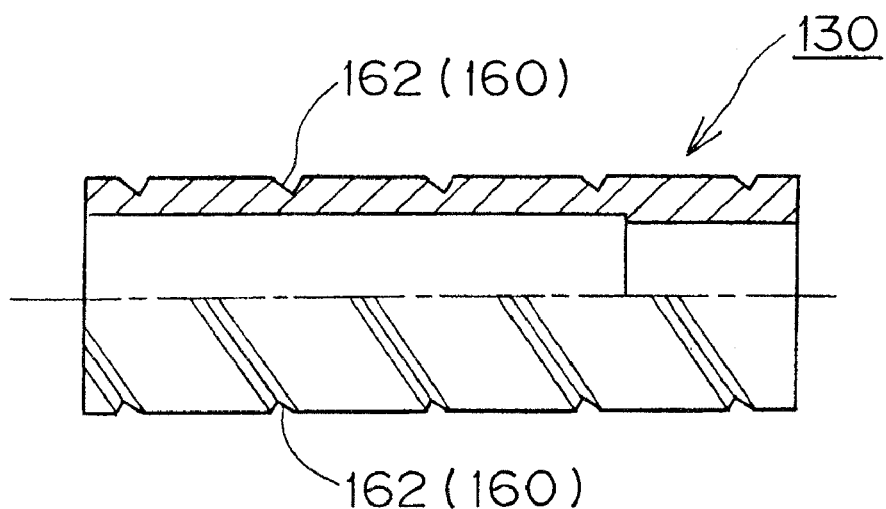
FIG. 7(b) is an elevational view, partly in axial section of the inner sleeve of FIG. 7(a).

In the modification shown in FIGS. 7(a) and 7(b), the oil communicating groove 162, instead of being a straight, longitudinal grooves, is in the form of a helix on the outer circumferential surface of the sleeve 130. Because it is helical, groove 162 can be made in any desired length. Its function, however, is similar to that of longitudinal groove 161 (FIGS. 3(a) and 3(b)). In the embodiment having a helical groove, and in the embodiment having a straight, longitudinal, groove, oil pressure in the second high pressure chamber R2 is balanced rapidly with oil pressure in the first high pressure chamber R1. The full hydraulic damping action of the tensioner is exhibited both at the time of engine start-up and during subsequent engine operation, backlash of the timing chain and excessive changes in chain tension are suppressed, and the generation of abnormal sounds is prevented.

A downward angle settable hydraulic tensioner 200, according to a second embodiment of the invention, is shown in FIGS. 8 to 11. It differs from the previously describe embodiment, only in the configuration of the oil pressure balance accelerating means 260. The structure is otherwise the same as in the first embodiment, and corresponding components are designated by reference numbers exceeding by 100 the reference numbers used in FIGS. 2 and 4-6.

Figure 8:
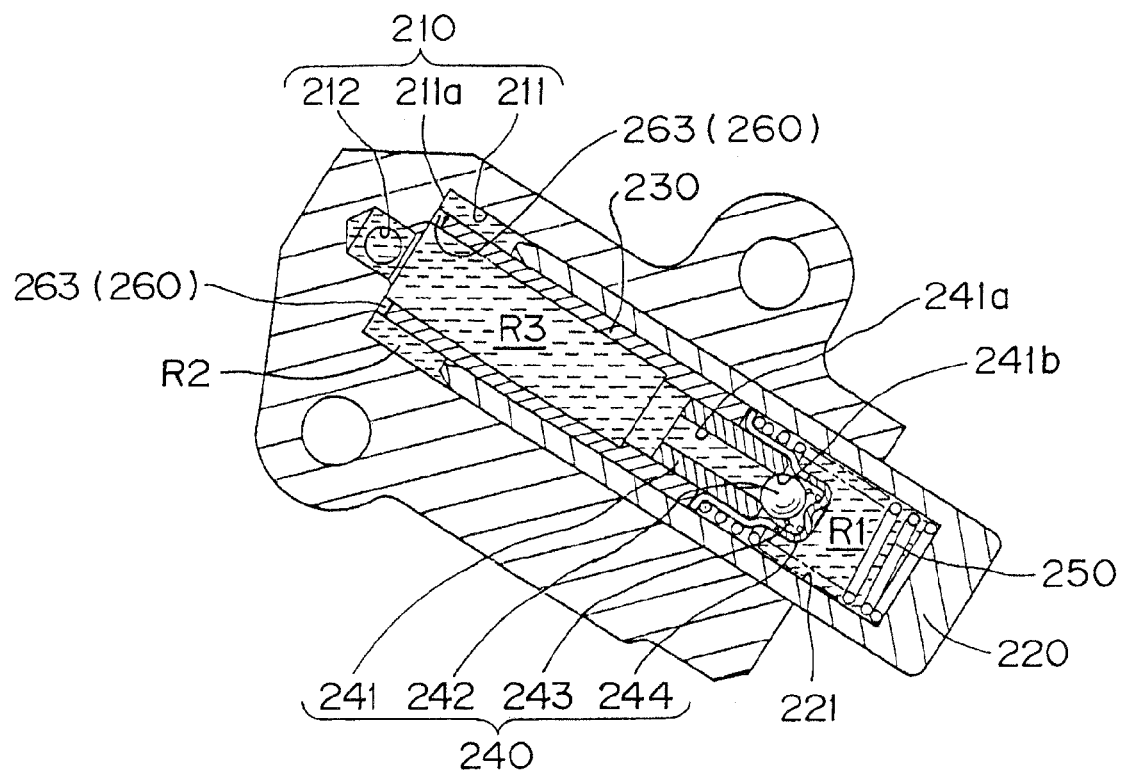
FIG. 8 is a sectional view of a hydraulic tensioner according to a second embodiment of the invention.
Figure 9A:
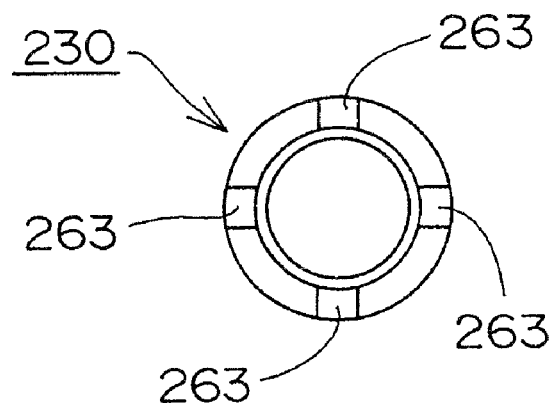
FIG. 9(a) is an end view of the inner sleeve of the tensioner of FIG. 8.
Figure 9B:
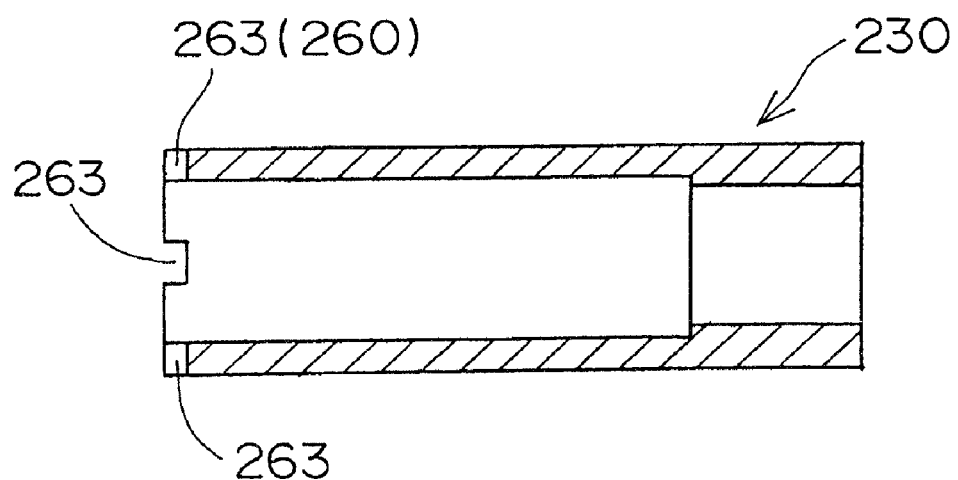
FIG. 9(b) is an axial cross-sectional view of the inner sleeve of FIG. 8.
Figure 10:
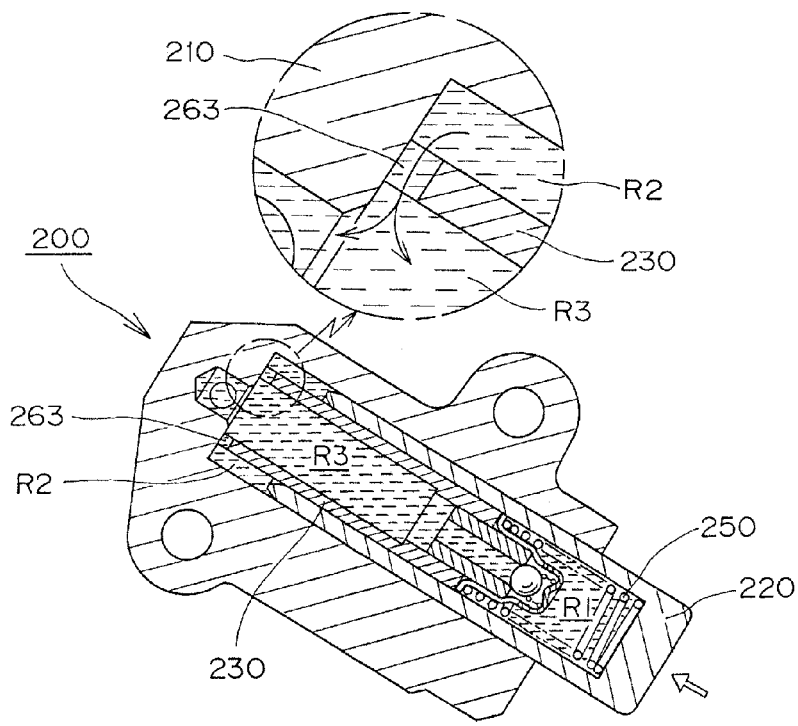
FIG. 10 is a schematic cross-sectional view of the tensioner of the second embodiment, illustrating, in an enlarged auxiliary view, the direction of increase in oil pressure by oil communication through grooves formed at the end of the inner sleeve when the plunger is pushed in the retracting direction.
Figure 11:
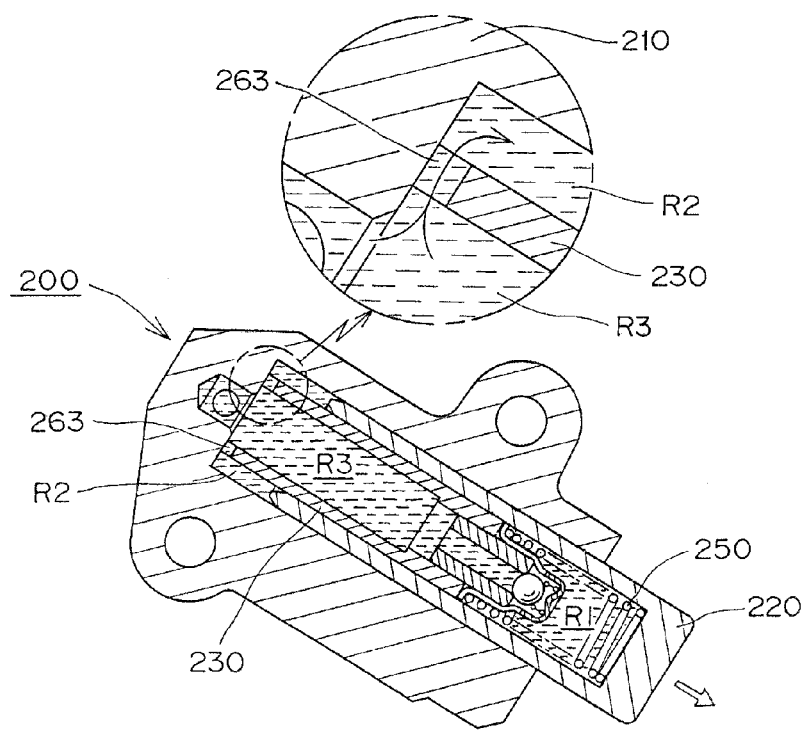
FIG. 11 is a similar schematic cross-sectional view of the tensioner of the second embodiment, illustrating, in an enlarged auxiliary view, the direction of increase in oil pressure by oil communication through grooves formed at the end of the inner sleeve when the plunger is moved in the protruding direction.

As shown in FIGS. 8, 9(a) and 9(b), the oil pressure balance accelerating means 260, which balances oil pressure in the second high pressure chamber R2 with oil pressure in the first high pressure chamber R1, takes the form of one or more oil communicating grooves 263 formed in the rear end of the sleeve 230. When the plunger 220 is pushed back into the tensioner housing 210 as shown in FIG. 10, or when the plunger 220 moves in the protruding direction as shown in FIG. 11, the oil pressure in the second high pressure R2 is rapidly balanced with the high pressure in the first high pressure chamber R1. Thus, the tensioner has the ability to follow and respond to sudden and large change in chain tension. In FIGS. 10 and 11, as in FIGS. 5 and 6, arrows in the grooves denote the flow of pressure. As mentioned previously, the percentage change in volume of chamber R2 is always greater than the change in volume of chamber R1 for a given amount of plunger movement. Therefore, as the plunger is pushed inward, flow of oil from chamber R2 into reservoir R3 tends to balance the pressures in chambers R2 and R1. Similarly, as the plunger moves in the protruding direction, flow of oil from reservoir R3 into chamber R2 tends to balance the pressures in chambers R2 and R1.

Further, although the oil communicating grooves 263 are shown as four grooves positioned at 90 degree intervals at the rear end of the sleeve 230, the grooves can be provided in any desired number, e.g., two or three grooves, and at various positions and relationships with one another.

In the embodiment shown in FIGS. 8-11, the grooves in the rear end of the sleeve provide direct communication between the high pressure chamber R2 and reservoir R3. No direct communication takes place between chambers R2 and R1. However, the balancing of pressure between chambers R1 and R2 takes place by virtue of the flow of oil between chamber R2 and reservoir R3, which prevents the oil pressure in chamber R2 from greatly exceeding the pressure in chamber R1 on retracting movement of the plunger and prevents the oil pressure in chamber R2 from falling far below the pressure in chamber R1 when the plunger moves in the protruding direction.

Figure 12A:
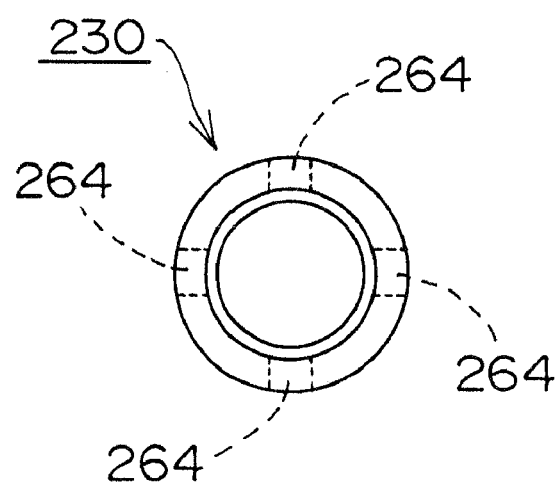
FIG. 12(a) is an end view of a modified version of the inner sleeve shown in FIGS. 9(a) and 9(b)
Figure 12B:
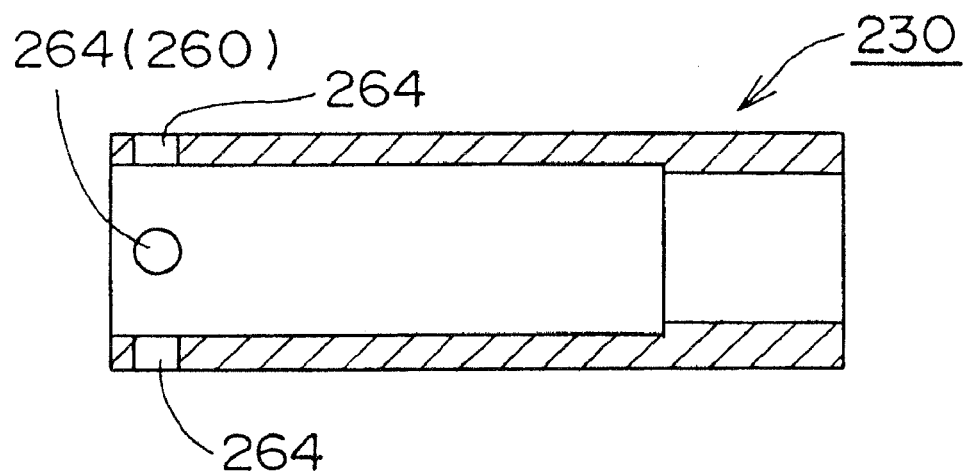
FIG. 12(b) is an axial cross-sectional view of the modified inner sleeve of FIG. 12(a)

In a modification shown in FIGS. 12(a) and 12(b), instead of plural grooves formed in the rear end of the sleeve, the oil pressure balance accelerating means comprises one or more small holes 264 extending through the wall of the sleeve and providing communication between the oil reservoir inside the sleeve and the second high pressure oil chamber surrounding the rear portion of the sleeve. In the embodiment shown in FIGS. 12(a) and 12(b), holes 264 are provided at four positions adjacent the rear end of the sleeve 230, the holes being evenly spaced from one another at 90 degree intervals about the circumference of the sleeve. The number and arrangement of the holes can, of course, be varied.

Figure 13A:
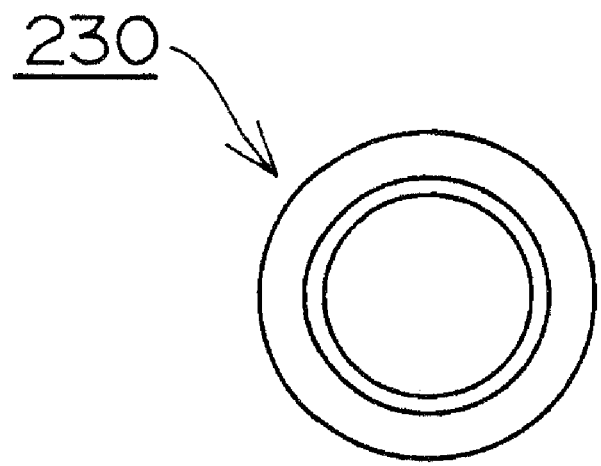
FIG. 13(a) is an end view of another modified version of the inner sleeve shown in FIGS. 9(a) and 9(b)
Figure 13B:
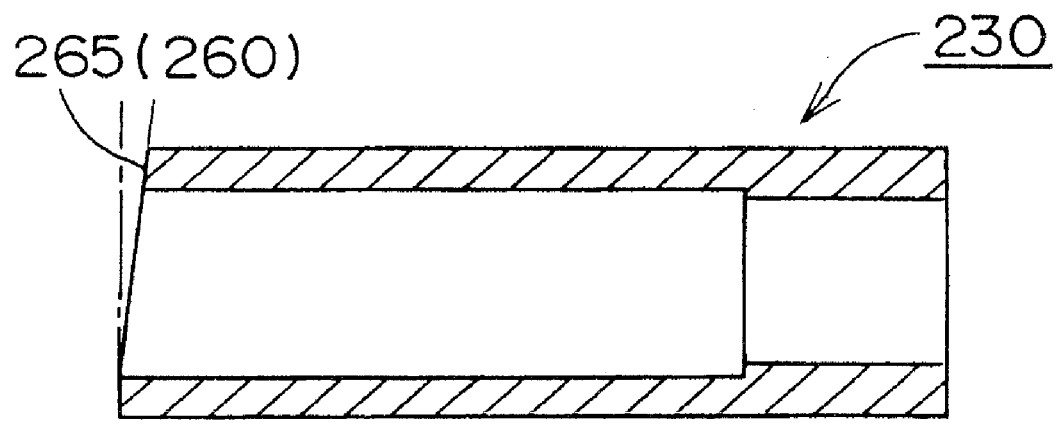
FIG. 13(b) is an axial cross-sectional view of the modified inner sleeve of FIG. 13(a)

In another modification, shown in FIGS. 13(a) and 13(b), the oil pressure balance accelerating means takes the form of an inclined oil communicating clearance 265, formed by beveling the rear end of the sleeve 230.

Figure 14A:
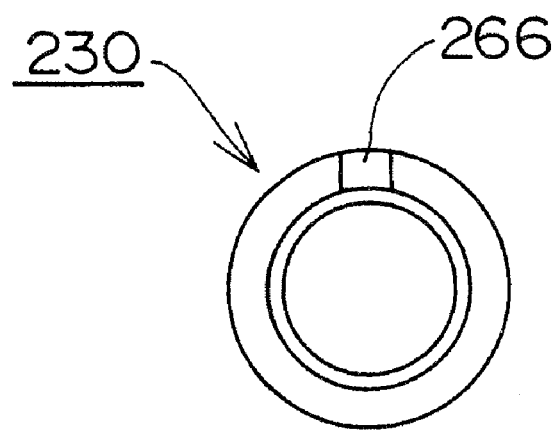
FIG. 14(a) is an end view of still another modified version of the inner sleeve shown in FIGS. 9(a) and 9(b)
Figure 14B:
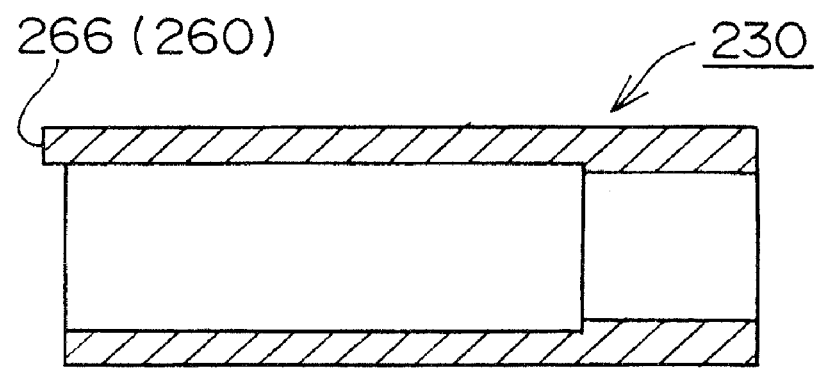
FIG. 14(b) is an axial cross-sectional view of the modified inner sleeve of FIG. 14(a)

In still another modification, shown in FIGS. 14(a) and 14(b), the oil pressure balance accelerating means is an arcuate clearance formed by providing a projection 266 on the rear end of the sleeve 230 to maintain the major part of the end of the sleeve spaced from the bottom of the plunger-accommodating hole in the tensioner housing.

Figure 15:
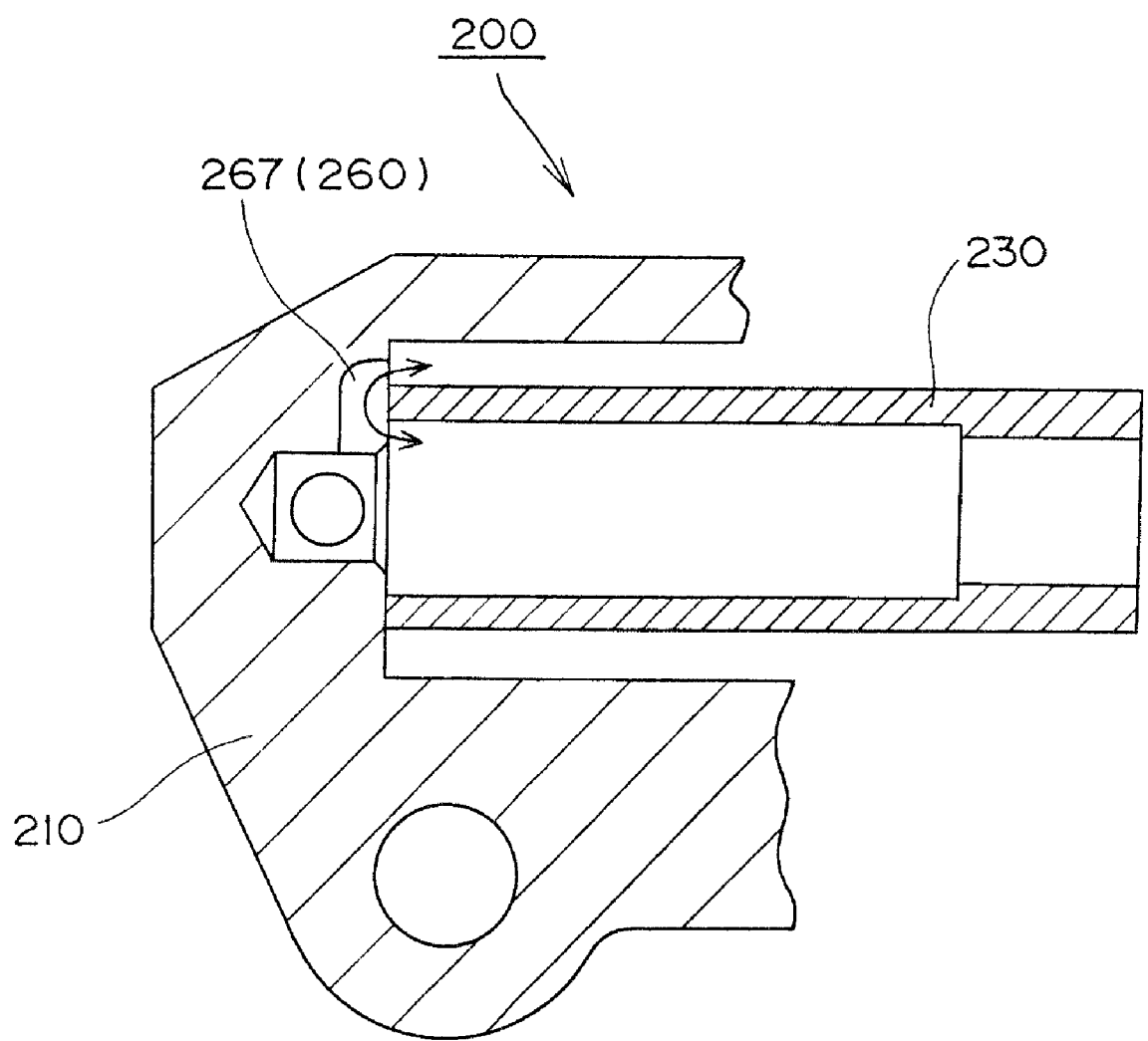
FIG. 15 is a fragmentary sectional view showing a modified version of the tensioner housing of FIG. 8.
Figure 16:
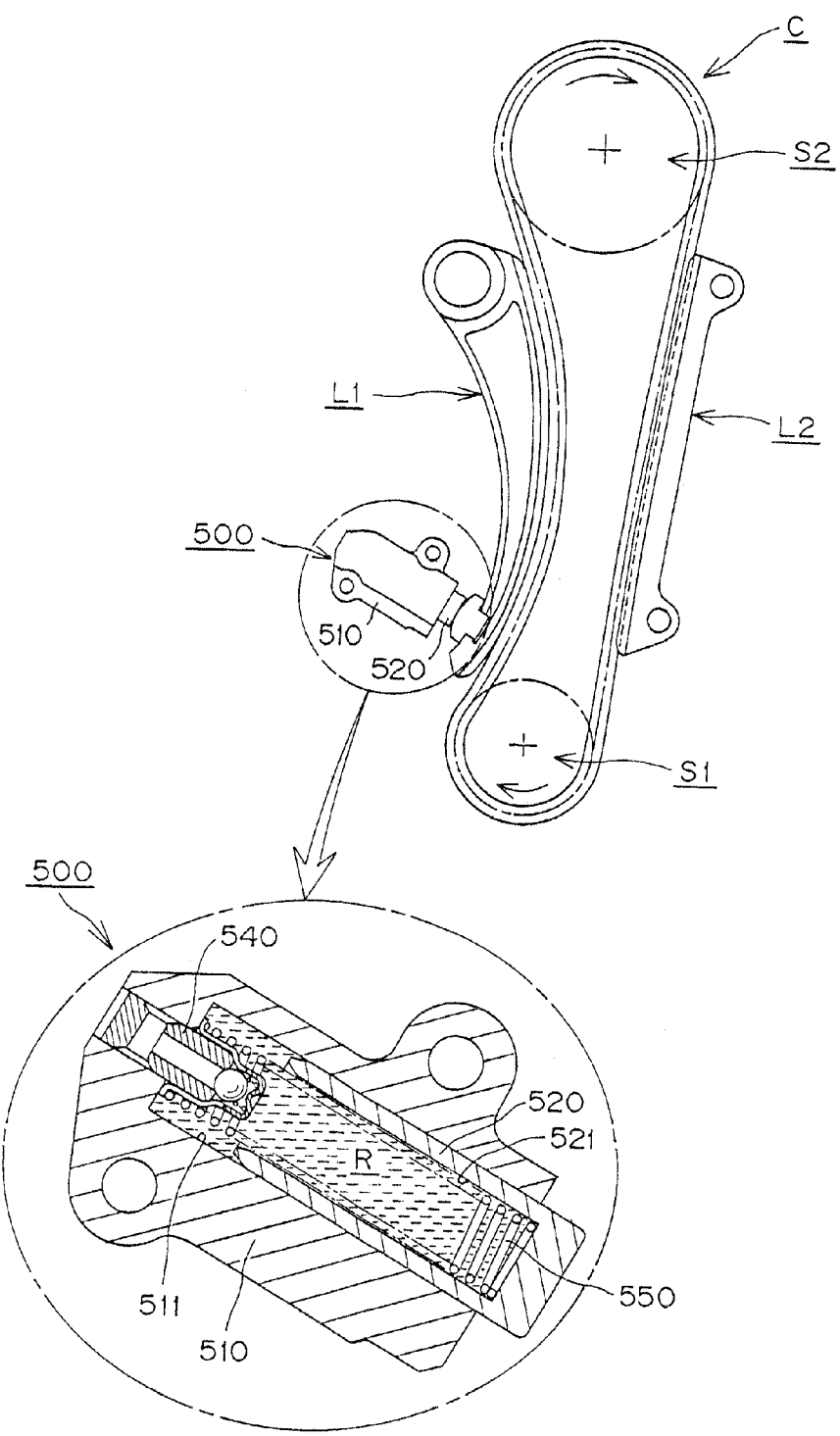
FIG. 16 is a schematic view of an engine timing transmission incorporating a conventional hydraulic tensioner, the tensioner being shown in greater detail in an enlarged auxiliary view.
Figure 17:
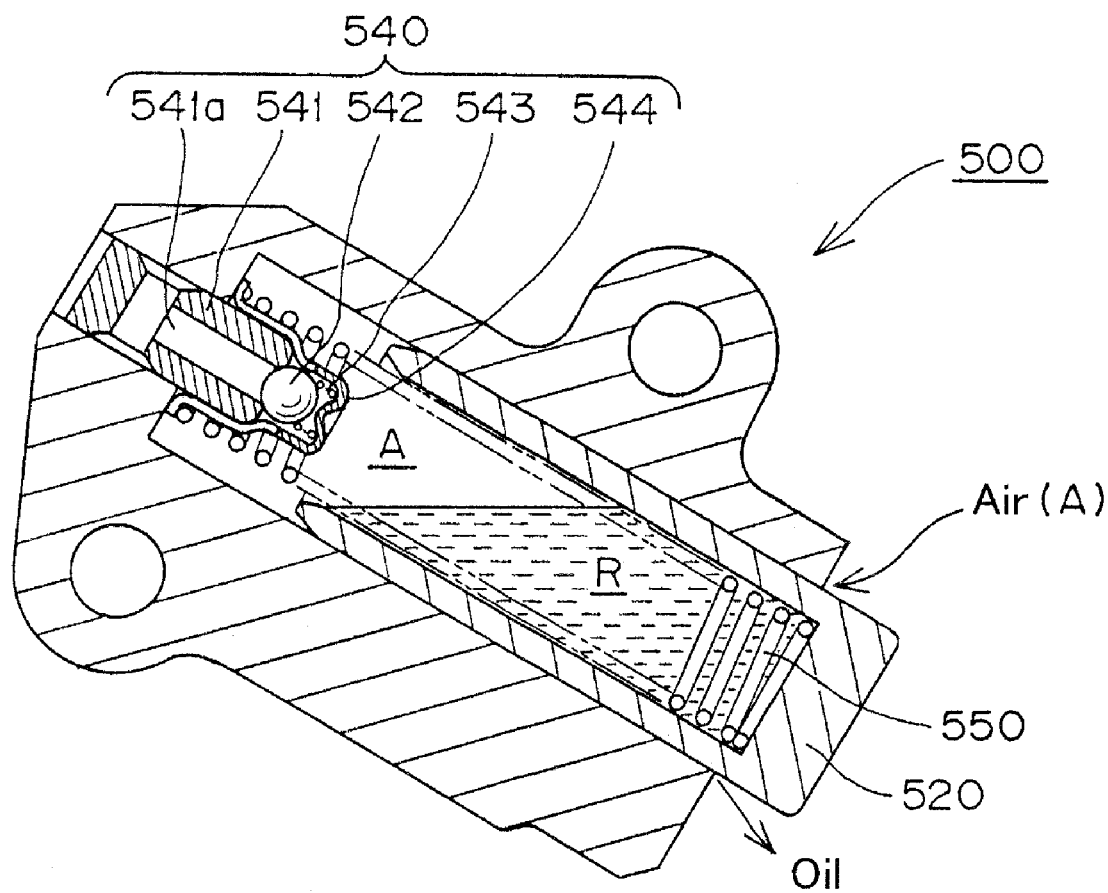
FIG. 17 is a sectional view showing the oil level in the tensioner of FIG. 16, when the engine has not been operated for a long period of time.

In the modification shown in FIG. 15, the rear end of the sleeve 230 has a uniform annular cross-section, and the oil pressure balance accelerating means is formed by a recess 267 formed in the bottom of the plunger-accommodating hole and providing communication between the high pressure chamber outside the sleeve and the reservoir inside the sleeve.

In summary, in the embodiments of FIGS. 9-15, if an increase in oil pressure in the second high pressure chamber R2 occurs due to a change in chain tension at the time of starting the engine or during the subsequent engine driving occurs, the pressure in the second high pressure chamber can instantaneously adapt to the oil pressure in the first high pressure chamber, and the maximum damping effect on changes in chain tension both at the time of engine start-up, and during subsequent engine operation can be exhibited rapidly.

The advantages of the invention can also be realized only in hydraulic tensioners having ratchet mechanisms for limiting retracting movement of the plunger. Moreover, although the tensioner of the invention is preferably mounted downwardly at an oblique angle on a vehicle engine, it can be mounted so that its plunger protrudes either horizontally or upward.

What is claimed is:

1. A downward angle settable hydraulic tensioner comprising:
   a housing having a plunger-accommodating hole with a cylindrical inner wall and a bottom end;
   a plunger having a cylindrical outer surface, the plunger being slidable in said plunger-accommodating hole and protruding therefrom, for applying tension to a traveling chain, said plunger having a hollow interior portion with a cylindrical inner wall, said hollow interior portion having an opening facing toward the bottom end of the plunger-accommodating hole, the plunger having an annular end portion surrounding said opening, and a part of the hollow interior portion of the plunger forming a first high pressure oil chamber;
   a plunger-biasing spring disposed in said high pressure oil chamber and urging the plunger in a direction to protrude from the housing;
   an oil supply passage for supplying oil to the high pressure oil chamber;
   a check valve unit arranged to block flow of oil from the high pressure oil chamber through the oil supply passage; and
   a hollow sleeve having a first end fixed at the bottom end of the plunger-accommodating hole and communicating with said oil supply passage, said sleeve extending into the hollow interior portion of the plunger and having a second end opposite from said first end, the interior of the sleeve forming an oil reservoir, and the sleeve having a cylindrical outer circumferential surface in sliding contact with said cylindrical inner wall of the plunger, and said check valve unit being fixed to said sleeve adjacent said second end thereof whereby the check valve is located inside the hollow interior portion of the plunger;

in which a second high pressure oil chamber is defined by a part of the inner wall of said plunger-accommodating hole, the bottom end of the plunger-accommodating hole, the annular end portion of said plunger, and a portion of the outer circumferential surface of said sleeve;

the tensioner further comprising means for accelerating the balance between oil pressure in said first high pressure chamber and oil pressure in said second high pressure chamber;

said means for accelerating the balance of oil pressure comprising a longitudinal oil circulating groove formed on the outer circumferential surface of said hollow sleeve, said groove extending from said first end to said second end and providing oil communication between said first high pressure chamber and said second high pressure chamber.

\* \* \* \* \*